United States Patent
Garaas et al.

(10) Patent No.: US 9,703,915 B2
(45) Date of Patent: Jul. 11, 2017

(54) METHOD FOR DETERMINING A SEQUENCE FOR DRILLING HOLES ACCORDING TO A PATTERN USING GLOBAL AND LOCAL OPTIMIZATION

(71) Applicant: Mitsubishi Electric Research Laboratories, Inc., Cambridge, MA (US)

(72) Inventors: Tyler Garaas, Brookline, MA (US); Matthew Brand, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 426 days.

(21) Appl. No.: 14/339,877

(22) Filed: Jul. 24, 2014

(65) Prior Publication Data
US 2016/0026747 A1    Jan. 28, 2016

(51) Int. Cl.
G06F 15/18 (2006.01)
G06F 17/50 (2006.01)
B23K 26/02 (2014.01)
B23K 26/38 (2014.01)
G05B 19/4093 (2006.01)
G06Q 10/04 (2012.01)
G06N 99/00 (2010.01)

(52) U.S. Cl.
CPC .......... *G06F 17/5081* (2013.01); *B23K 26/02* (2013.01); *B23K 26/38* (2013.01); *G05B 19/4093* (2013.01); *G05B 19/40937* (2013.01); *G06N 99/005* (2013.01); *G06Q 10/047* (2013.01); *G05B 2219/34112* (2013.01); *G05B 2219/45139* (2013.01); *G05B 2219/49363* (2013.01); *G06F 2217/08* (2013.01); *G06F 2217/12* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 5,037,183 A | 8/1991 | Gagosz et al. | |
| 6,034,349 A | 3/2000 | Ota et al. | |
| 6,107,600 A | 8/2000 | Kurosawa et al. | |

(Continued)

FOREIGN PATENT DOCUMENTS

| | | |
|---|---|---|
| JP | H10258373 A | 9/1998 |
| JP | 2001195112 A | 7/2001 |
| JP | 2004253006 A | 9/2004 |

OTHER PUBLICATIONS

Andresol et al, A Hopfield-Tank Neural Network Model for the Generalized Traveling Salesman Problem, 1999.*

(Continued)

*Primary Examiner* — Stanley K Hill
*Assistant Examiner* — Mikayla Chubb
(74) *Attorney, Agent, or Firm* — Gene Vinokur; James McAleenan; Hironori Tsukamoto (57) ABSTRACT

A method determines a sequence for drilling holes in a workpiece according to a pattern by first partitioning the holes in the pattern into packets. A global sequence of the packets is determined by solving a global traveling salesman problem (TSP), and a local sequence of the holes in each packet is determined by solving a local TSP for each packet. Then, the local sequences of the holes are joined according to the global sequence of the packets to determine a complete sequence for drilling the holes.

16 Claims, 7 Drawing Sheets

(56) References Cited

U.S. PATENT DOCUMENTS

| | | | |
|---|---|---|---|
| 8,362,392 B2 | 1/2013 | Elfizy et al. | |
| 2001/0053962 A1 | 12/2001 | Yoshida et al. | |
| 2003/0018401 A1* | 1/2003 | Sorkin | G05B 19/188 700/31 |
| 2014/0336811 A1* | 11/2014 | Yuki | G05B 19/4093 700/213 |
| 2014/0336977 A1* | 11/2014 | Niwayama | G05B 19/19 702/150 |
| 2015/0006230 A1* | 1/2015 | Yuki | G06Q 10/047 705/7.25 |

OTHER PUBLICATIONS

Bektas et al, The multiple traveling salesman problem: an overview of formulations and solution procedures, 2006.*

Dondo et al, A cluster-based optimization approach for the multi-depot heterogeneous fleet vehicle routing problem with time windows, 2007.*

Ernest et al, Fuzzy Logic Clustering of Multiple Traveling Salesman Problem for Self-Crossover Based Genetic Algorithm, 2012.*

Fisher et al, A generalized assignment heuristic for vehicle routing, 1979.*

Ho et al, A hybrid genetic algorithm for the multi-depot vehicle routing problem, 2008.*

Johnson et al, The Traveling Salesman Problem: A Case Study in Local Optimization, 1995.*

Sofge et al, Evolutionary Computational Approaches to Solving the Multiple Traveling Salesman Problem Using a Neighborhood Attractor Schema, 2002.*

* cited by examiner

METHOD FOR DETERMINING A SEQUENCE FOR DRILLING HOLES ACCORDING TO A PATTERN USING GLOBAL AND LOCAL OPTIMIZATION

FIELD OF THE INVENTION

The present invention relates to controlling a machine, and more particularly to determining an optimized sequence for drilling holes by a laser drilling machine.

BACKGROUND OF THE INVENTION

Multilayered circuit boards require high-density drilling of small holes to provide electrical connections between strata to support an ever increasing miniaturization of electronics devices. Laser drilling machines are frequently used for drilling the holes. It is important to note some unusual aspects exist with certain laser hole drilling machines. First, there can be a minimal amount of time, called a refractory period, which must pass between laser drillings, which may cause the machine to stall at a specific hole when the hole is reached before that time has passed. Second, it is sometimes necessary for holes to be drilled multiple times. However, there is usually some period of time that must pass before the hole can be redrilled.

There are many methods for determining a sequence of holes to be drilled by a laser drilling machine, or a similar hole processing machine. A simplest method is to drill one hole, and move immediately to the next nearest hole, and continuing this sequence until all holes have been processed. However, this can become quite inefficient as the machine may require large jumps due to local minima from a poor optimization of the drilling sequence.

Another option is to formulate the problem as a traveling salesman problem (TSP). However, given the usual size of the pattern to be drilled, this would require either a very simple procedure—resulting in a poor sequence—or very long computation times.

JP 2001195112 describes a laser drilling route determination method capable of shortening the calculation time required for the determination of a route using a TSP formulation. A route for regulating the sequence of laser beam positions is determined based on information concerned with a plural of previously set drilling positions by applying the traveling salesman problem. The route determination, based on the TSP, includes a step for dividing drilling positions into a plural buckets, a step for determining a traveling route for regulating the traveling order of the plural divided buckets, a step for determining a start point of the laser beam and the end point of the laser beam in each divided bucket, and a step for determining a shortest route for laser beam positions between the start point and end point of each divided bucket and the end point of a certain bucket is connected to the start point of a bucket to be traveled next.

Figure 2A:
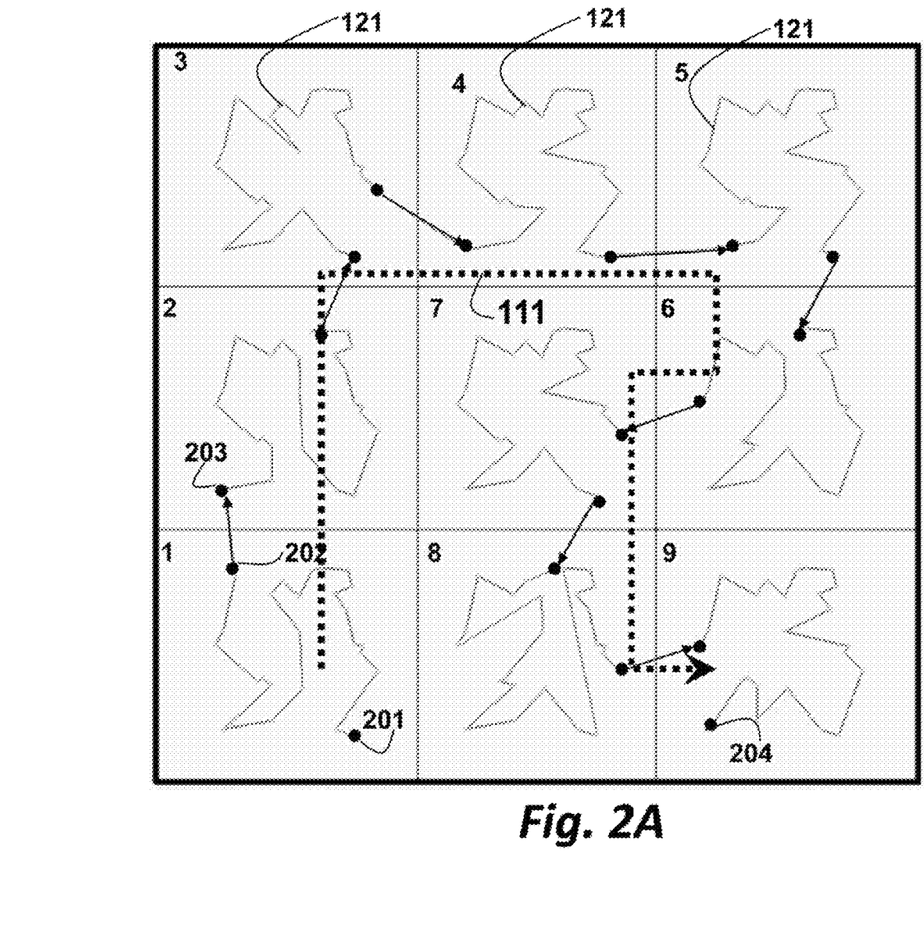
FIG. 2A is a schematic of the exemplar hole drilling pattern solved by a global and a local TSP solver to generate optimized local sequences of holes joined to each other according an optimized global sequence of packets according to embodiments of the invention.
Figure 2B:
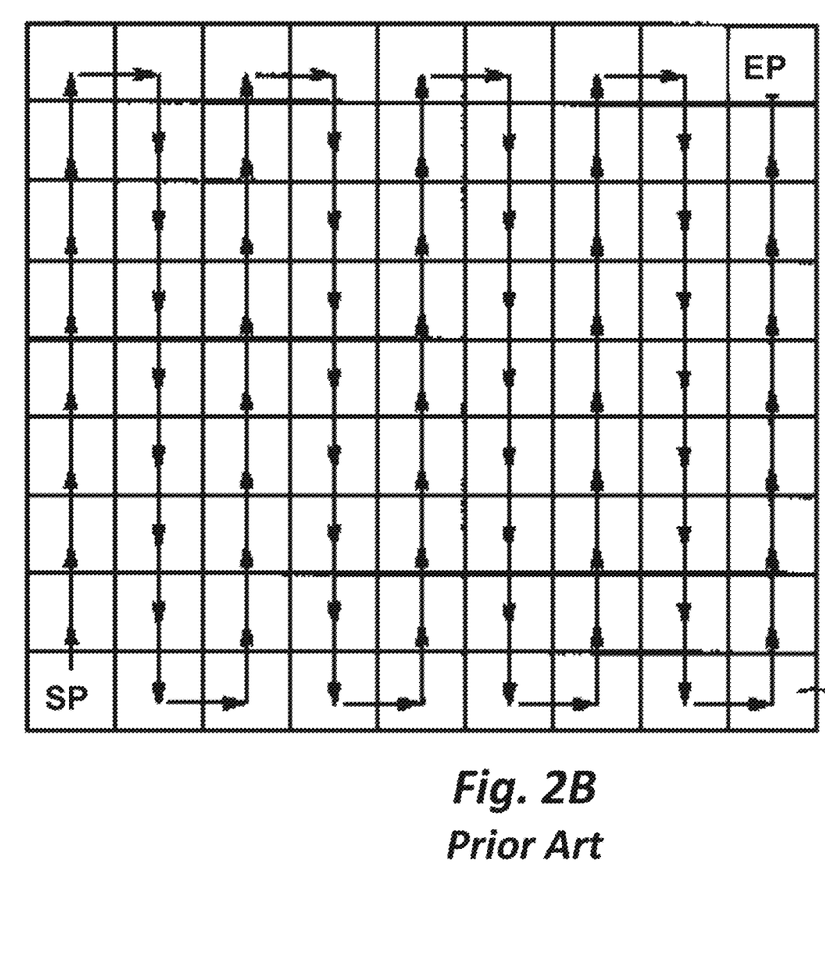
FIG. 2B is a schematic of a prior art drilling order without a global minimization.

As shown in FIG. 2B, that method uses a predetermined serpentine ordering for the buckets, which may be suboptimal. That method also uses stalling and ending points based on a minimum distance within a next bucket, which also may be suboptimal. Finally, that method does not consider some of the particulars that can exist for laser drilling machines, such as refractory period of the laser.

Another patented method (U.S. Pat. No. 8,362,392) describes the production of an optimized sequence by evaluating a distance between each hole in the TSP, not as a Euclidean distance on the map of holes, but as a combined distance that all axes need to move to drill a given hole.

SUMMARY OF THE INVENTION

Costs that are used in the traveling salesman problem (TSP) used by embodiments of the invention attempt to closely estimate transitions between holes in a sequence. The costs can be based on Euclidean distances or times to drill the holes. Additionally, the costs attempt to take into account a refractory period of the laser that is required between subsequent drillings, which can be accomplished using a minimum operator, assuming that the costs are a reasonable estimate of transition time for the machine. Alternatively, a period of time can be passed through an inverse of the time estimation function (or similar function) to obtain an equivalent cost.

Specifically, a method determines a sequence for drilling holes according to a pattern by a drilling machine. The holes in the pattern are partitioned into packets. A global sequence of the packets is determined by solving a global traveling salesman problem (TSP), and a local sequence of the holes in each packet is determined by solving a local TSP. Then, the local sequences are joined according to the global sequence to determine the sequence for drilling the holes.

It is noted that the invention solves two different TSP problems, one for the global sequence of packets, and the other for each local sequence of holes in each packet. In the prior art, the global sequence of packets is predetermined and not optimized using a TSP, see JP 2001195112.

DETAILED DESCRIPTION OF THE EMBODIMENTS

Figure 1A:
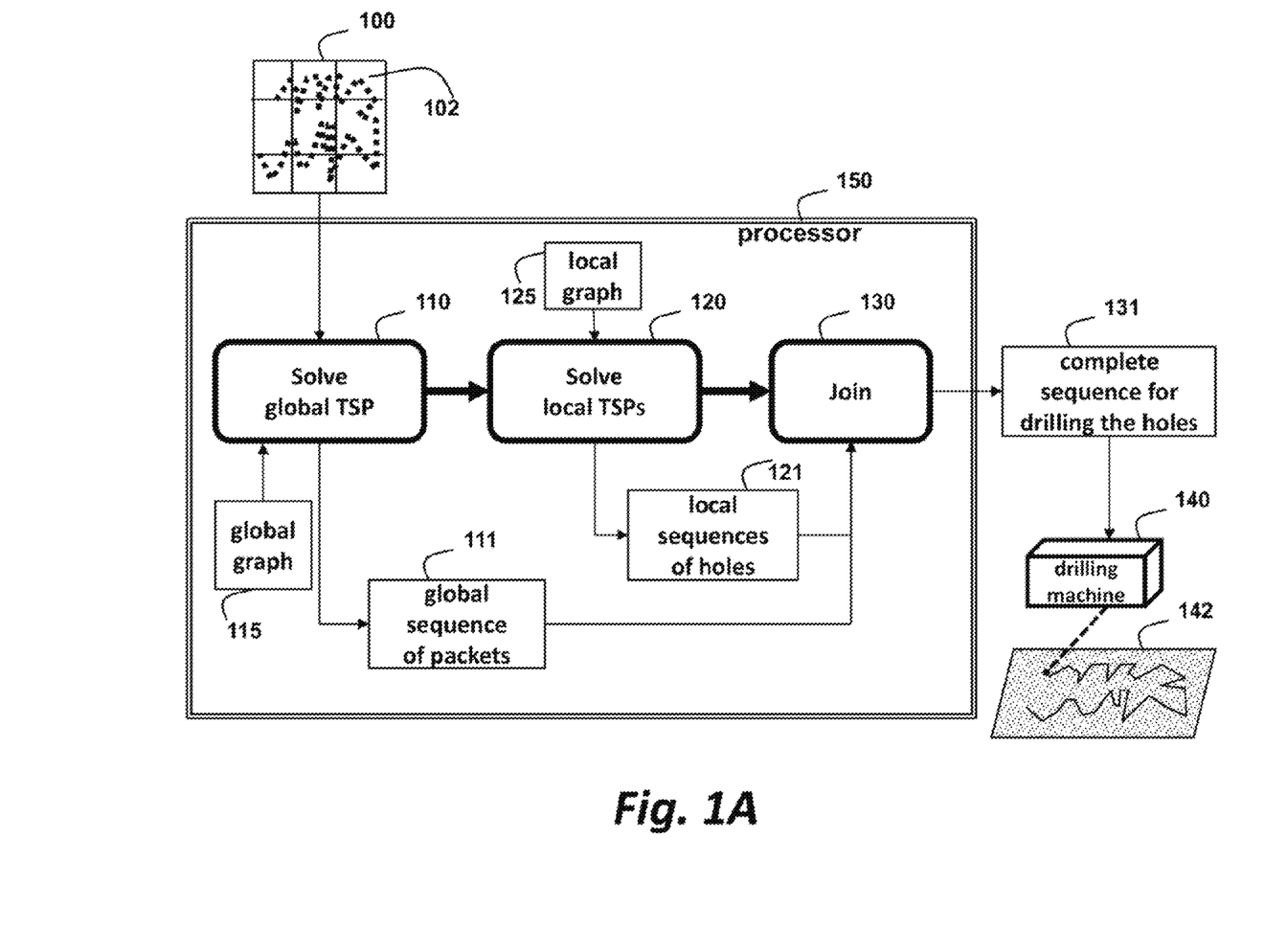
FIG. 1A is a flow diagram of a method for determining a sequence for drilling holes according to a pattern by a drilling machine.

As shown in FIG. 1A, embodiments of the invention provide a method for determining a sequence for drilling holes in a workpiece 142 according to a pattern 100 by a drilling machine 140. In FIG. 1A, thin lines indicate data flow, and thick lines indicate process flow. The method is formulated as a combination of global and local traveling salesman problems (TSPs). Specifically, the holes in the pattern are partitioned into packets 102. The global TSP is solved 110 to determine a sequence of the packets 111. The local TSP for each packet is solved 120 to determine a local sequence of the holes 121 in each packet. Then, the local sequences of the holes are joined 130 according to the global sequence of the packets to determine the sequence 131 for drilling the holes in the workpiece 142 by the machine 140. The method can be performed in a processor 150 connected to memory and input/output interfaces by buses as known in the art.

In one embodiment, the global TSP is solved using a global graph 115 where vertices represent a set of candidate starting points and a set of candidate ending points for each packet, and each local TSP is solved using a local graph 125 where the vertices represent the holes.

In another embodiment, the vertices in the global graph represent a location of each packet, and the vertices in the local graph represent a location of a previous packet, a location of a next packet with respect to a current packet in the global sequence, and the holes.

Edges between the vertices represent costs, which are minimized during the solving to optimize the sequences.

Figure 1B:
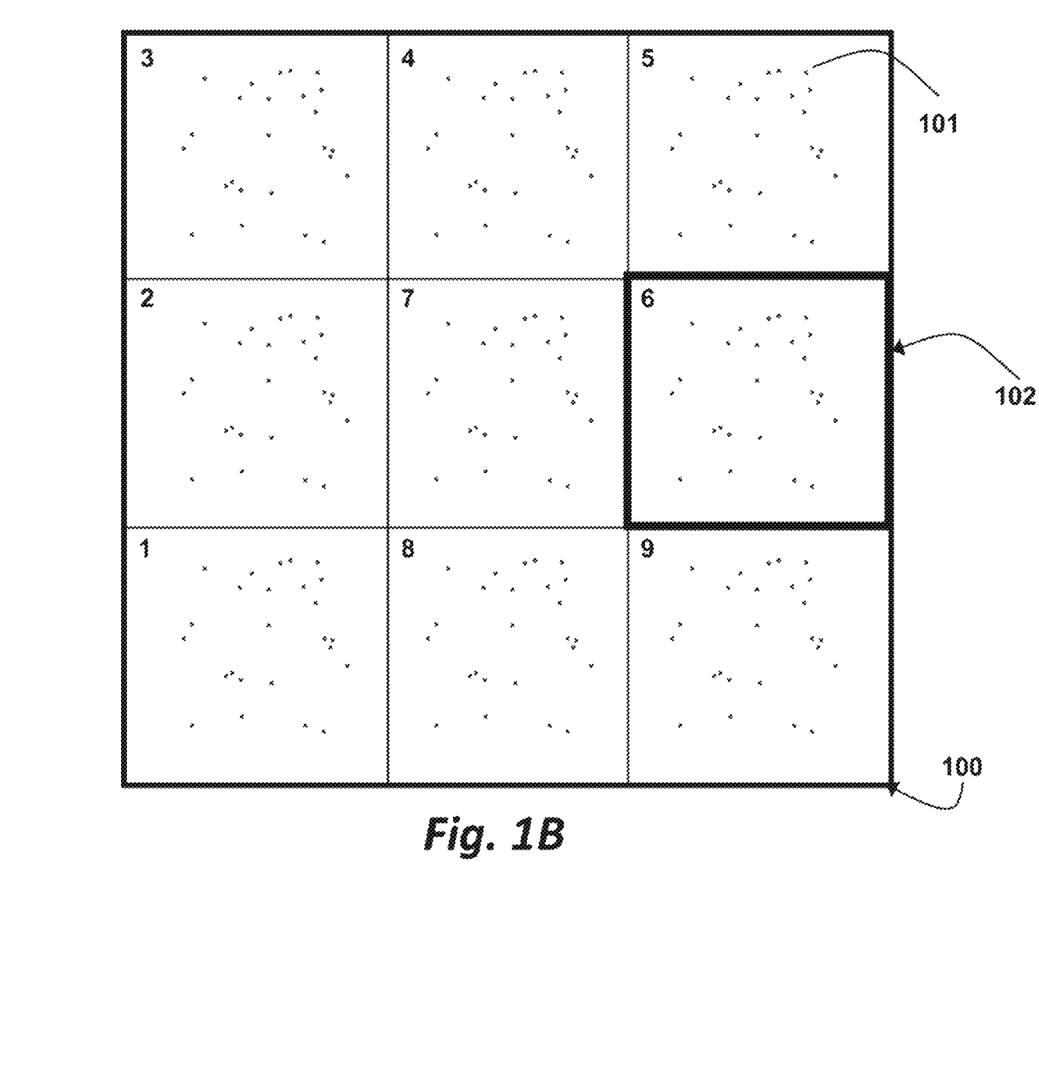
FIG. 1B is an exemplar hole drilling pattern that includes repetition and a partitioning of holes into disjoint packets to be drilled according to embodiments of the invention.

FIG. 1B shows a pattern 100 of holes 101 partitioned into, e.g., nine {1, 2, . . . 9} packets 102. If the pattern includes repetitive subpatterns of the holes, then the partitioning can be adapted to the subpatterns. The partitioning can also equalizes densities of the holes the packets. It is understood that the partitioning can also be arbitrary.

FIG. 2A shows the optimal sequence for the pattern in FIG. 1B. As shown in FIG. 2A, the global TSP determines an optimal global sequence 111 in which the packets, e.g., {1, 2, . . . , 9}, are visited. The local TSP determines the optimal local sequences 121 in which the holes in each packet 102 are drilled. Then, the local sequences are joined according to the global sequence. The optimal sequence includes an initial SP 201, followed by pairs of EPs and SPs 202-203 that join the packets, and a final EP 204. When the global sequence of the packets, and the SP and EP in each packet is known, the path between the EP of the current packet and the SP of the next packet is implicitly defined.

The global graph determines the order in which the packets are drilled, and the SP and EP of each local sequence of the packets. This is performed by constructing the global TSP graph in such a way that a subset of nodes for each packet is included in the global graph that represent candidate SPs and EPs. These candidate SPs and EPs are then connected within a single packet in the global graph using costs that result in all intrapacket nodes being visited sequentially; as such, the first and last of the candidate SPs and EPs are then selected as the SP and EP for that packet, respectively.

Figure 3:
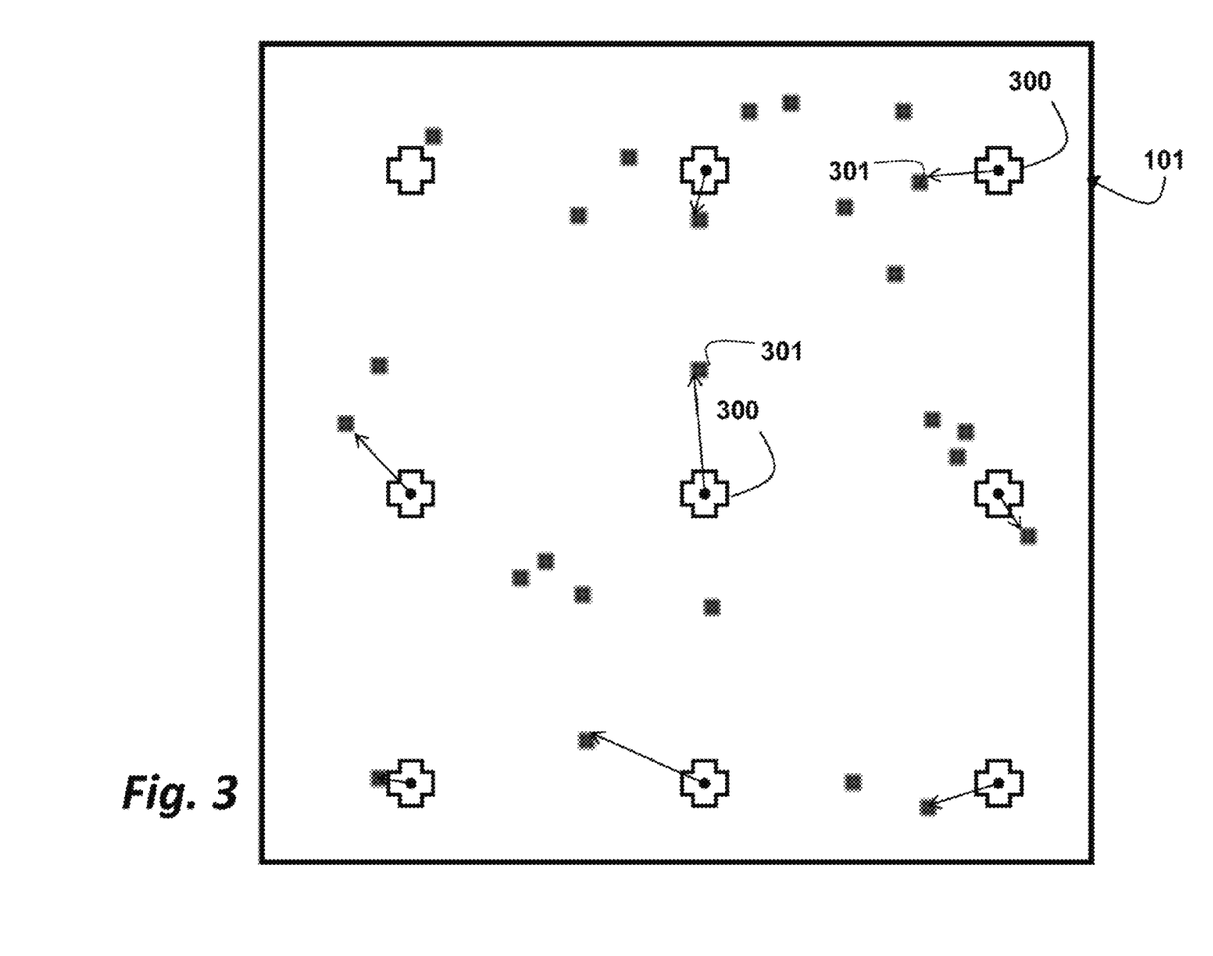
FIG. 3 is a schematic of exemplar starting and ending points for a single packet using a superimposed a 3×3 grid of nodes and selecting a nearest hole to each node according to embodiments of the invention.

As shown in FIG. 3, the candidate SPs and EPs of a packet are determined superimposing a grid of nodes 300 on each packet 102. The number and locations of the SPs and EPs can be selected in any manner to construct a good representation of candidate SPs and EPs points. A nearest hole 301 to each node is identified. Then, the optimal SPs and EPs are determined using the nodes and the holes nodes.

Figure 4:
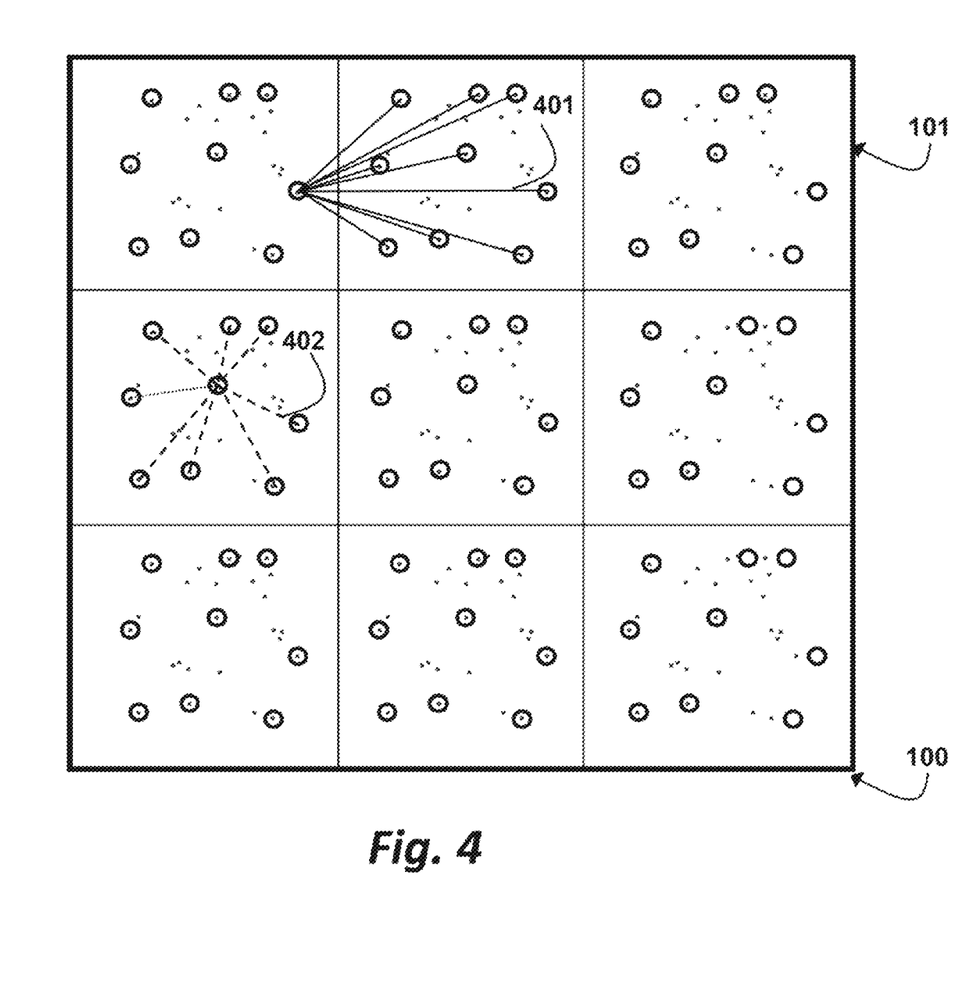
FIG. 4 is a schematic of a partial global TSP with connections from one node in one packet to all nodes in an adjacent packet, (solid lines), as well as from one node in a one packet to all nodes in the same packet (dashed lines)

As shown in FIG. 4, connections (solid lines) 401 from each node in each packet to all nodes in all adjacent packets are determined, as well as connections (dashed lines) 402 from each node to all nodes in the same packet. Costs for intrapacket connections are such that all intrapacket nodes are visited sequentially in the global sequence produced by solving the global TSP, whereas all interpacket connections minimizes the costs between EPs and SPs. Therefore, the final sequence indicates a global sequence of packets and an optimal SP and EP for each individual packet. These SPs and EPs can then be used to construct an optimal local TSP for each packet.

After the global graph is completed, the TSP solver produces the optimal global sequence 111 of the packets based on the connections, which is followed by solving the local TSP for an optimal local sequence of the holes in each packet based on the SPs and the EPs. Finally, the optimal local sequences are joined according to the optimal global sequence to determine the sequence for drilling the holes in the workpiece.

The costs represent the distance, e.g., the Euclidean distance between two holes, or time required to transition two holes, unless otherwise noted. The costs can also take into account a refractory period of the laser, which can be determined using a minimum operator, assuming that the cost is a good estimate of the transition time for the machine. Alternatively, a period of time can be passed through an inverse of a time estimation function, or similar function, to obtain an equivalent cost.

Figure 5:
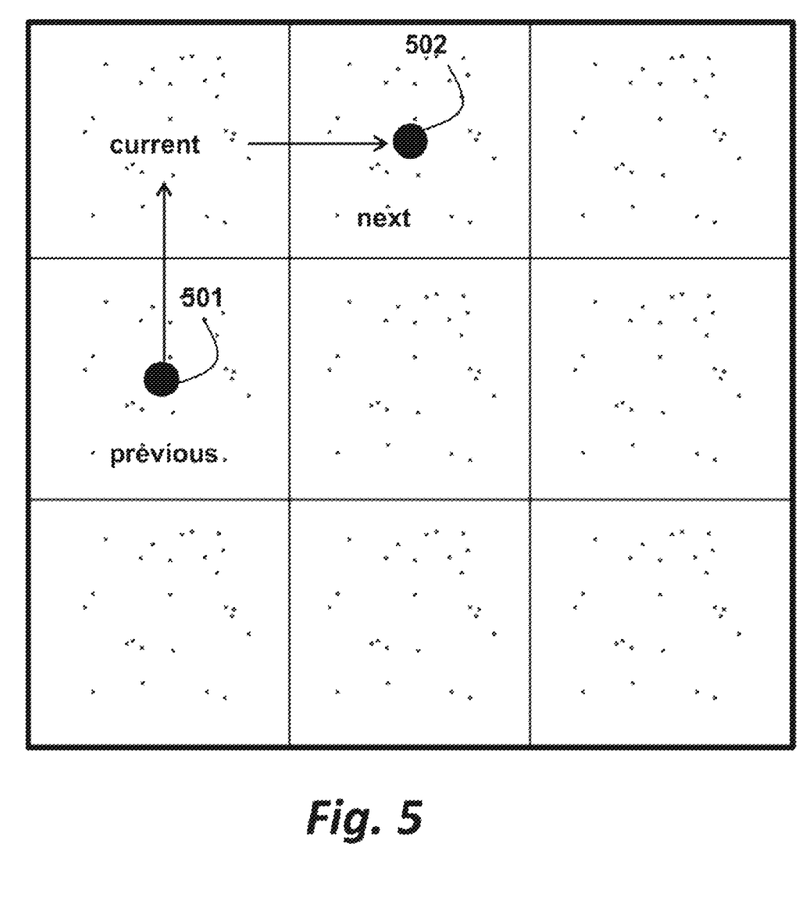
FIG. 5 is a schematic of two virtual nodes added to a local TSP to help determine an optimal local sequence of starting points (SP) and ending points (EP).

In an alternative embodiment, as shown in FIG. 5, two virtual holes 501-502 are added for each packet to help determine the local sequences. The first virtual hole 501 is associated with a previous packet, and the second virtual hole 502 is associated with a next packet, with respect to the current packet. Instead of selecting the hole closest to the previous packet or a crossing location, the two virtual holes 501-502, holes never drilled, are added to the local TSP to determine the SP and EP for each packet.

In this alternative local TSP, all holes are connect as before, but the two additional virtual holes are added with coordinates that follow some estimate of the locations of the previous and next packet to be processed, i.e., a geometric center of the packet, or center of mass (with respect to holes) of the packet. These two virtual holes are then connected with every hole in the current packet using a cost calculation similar to the inter-real-hole calculation shown in FIG. 3. The two virtual holes are connected with a cost that ensures both holes are sequentially drilled in the global sequence, e.g., with zero or negative cost. Then, following a possible resequencing to ensure the virtual hole in the previous packet is first in the sequence, and the virtual hole in the next packet is last, the sequence defines the optimal SP, EP, and local sequence to use for the packet by removing both virtual holes from the sequence.

In this alternative embodiment, each packet is represented by a single node, where the global sequence is produced by solving the TSP constructed in this manner. The nodes in this formulation of the global TSP can represent the geometric center or center of mass of the packet as described above, among other possible representations.

Additionally, if multiple drillings are required for each hole, the local TSP can be extended to produce an optimized sequence that includes each real hole being drilled a specified number of times. For instance, if each hole is required to be drilled twice, then a second instance of each real hole can be added to the TSP that represents a second drilling by the laser. Each second hole is connected with every other hole in the TSP using the above described costs, with one exception. All real holes are connected to their copies, i.e., collocated holes, with the period of time that represents the necessary time between redrilling a hole or, when a time estimate is not used for inter-hole costs, an equivalent cost that represents a delay. This allows the local TSP to determine the optimal sequence for performing multi-drilling of a packet.

In other cases, it is sometimes preferential to do multi-drilling processing by repeating the drilling sequence of a packet. However, if the time between two drillings of a given hole in the packet is smaller than a minimal required time between redrilling, which can happen when the packets are small, then the machine remains idle, the overall processing time for the pattern is increased.

To handle this case, an extension to the global TSP described above can be used. The extension is to add multiple copies, one for each repetition of the packet, of the potential SPs and EPs of a given packet to the global TSP. The copies are connected in the same way the original copies with the exception that the copies of a given packet's SPs and EPs are connected with each other using a cost that is equivalent to the minimal time between redrilling. The cost between copies can be further improved by estimating the time required for a single processing of all the holes in the packet, e.g., for example, by using the lower bound obtained from a Held-Karp procedure.

The patterns used to produce the holes on, e.g., circuit boards, are often highly repetitive, i.e., there are multiple instances of the same subpattern. The partitioning of the pattern into packets according to the subpatterns can drastically reduce the processing time to construct the local TSP sequences.

In particular, give an optimized sequence for one local TSP with virtual holes, an optimized sequence can be quickly produced by replacing the virtual holes from the original TSP with those for the new TSP, establishing an initial sequence following the exact sequence of the original TSP sequence, and running the TSP optimization procedure on the new TSP using, e.g., a K-Opt local search procedure, which reorders crossing routes.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for determining a sequence of drilling holes in a workpiece according to a pattern, wherein the pattern is partitioned into packets and the holes are drilled by a drilling machine, comprising:
    determining a global sequence of the packets by solving a global traveling salesman problem (TSP);
    determining a local sequence of the holes in each packet by solving a local TSP for each packet;
    joining the local sequences of the holes according to the global sequence of the packets to determine a complete sequence of drilling the holes by a drilling machine; and
    adapting the partitioning to equalize a density of the holes in each packet, wherein the steps are performed in a processor.

2. The method of claim 1, further comprising:
    adapting the partitioning to make use of repetitive subpatterns of the holes.

3. The method of claim 1, wherein the global TSP is solved using a global graph, wherein vertices represent a set of candidate starting points (SPs), a set of candidate ending points (EPs), and each local TSP is solved using a local graph taking into account the SP and EP determined in from the global TSP, wherein the vertices represent the holes.

4. The method of claim 1, wherein the global TSP is solved using a global graph, wherein the vertices in the global graph represent a location of each packet, and the vertices in the local graph represent a location for a previous packet and a location for a next packet with respect to a current packet in the global sequence, and the holes.

5. The method of claim 1, wherein the global TSP and the local TSP minimize a Euclidean distance between any two sequential holes to be drilled.

6. The method of claim 1, wherein the global TSP and the local TSP minimize a time for the drilling machine to travel between any two sequential holes.

7. The method of claim 1, further comprising:
    adding an instance of a particular hole to the local TSP for each time the particular hole is to be drilled and adapting a cost to account for a minimum time between redrilling the particular hole.

8. The method of claim 1, further comprising:
    adding an instance of a particular packet to the global TSP for each time the particular packet is be drilled and adapting a cost of the global TSP to account for a minimum time between redrilling the particular packet.

9. The method of claim 1, solving the local TSPs using graphs, wherein vertices represent the holes, and edges represent costs that take into account a refractory period of a laser in the drilling machine.

10. The method of claim 1, solving the global TSP and the local TSPs using graphs, wherein vertices represent the holes, and edges represent costs representing a period of time passed through an inverse of a time estimation function to obtain an equivalent cost.

11. The method of claim 3, further comprising:
    superimposing a grid of nodes on each packet to determine the candidate set of SPs and the candidate set of EPs in each packet for the global sequence.

12. The method of claim 1, further comprising:
    adapting the partitioning to repeated patterns;
    solving a single instance of the local TSPs for each repeated pattern; and
    optimizing the complete sequence for drilling the holes according to a starting point and an ending point in each packet of the repeated patterns.

13. The method of claim 4, wherein the location of the packet is a geometric center.

14. The method of claim 4, wherein the location of the packet is center of mass of the packet with respect to holes.

15. The method of claim 12, wherein the optimizing uses a K-Opt local search procedure.

16. A method for determining a sequence of drilling holes in a workpiece according to a pattern, wherein the pattern is partitioned into packets and the holes are drilled by a drilling machine, comprising:
    determining a global sequence of the packets by solving a global traveling salesman problem (TSP);
    determining a local sequence of the holes in each packet by solving a local TSP for each packet; and
    joining the local sequences of the holes according to the global sequence of the packets to determine a complete sequence of drilling the holes by a drilling machine,
    wherein the global TSP is solved using a global graph, wherein the vertices in the global graph represent a location of each packet, and the vertices in the local graph represent a location for a previous packet and a location for a next packet with respect to a current packet in the global sequence, and the holes, wherein the location of the packet is center of mass of the packet with respect to holes, and wherein the steps are performed in a processor.

* * * * *